Figure 1:
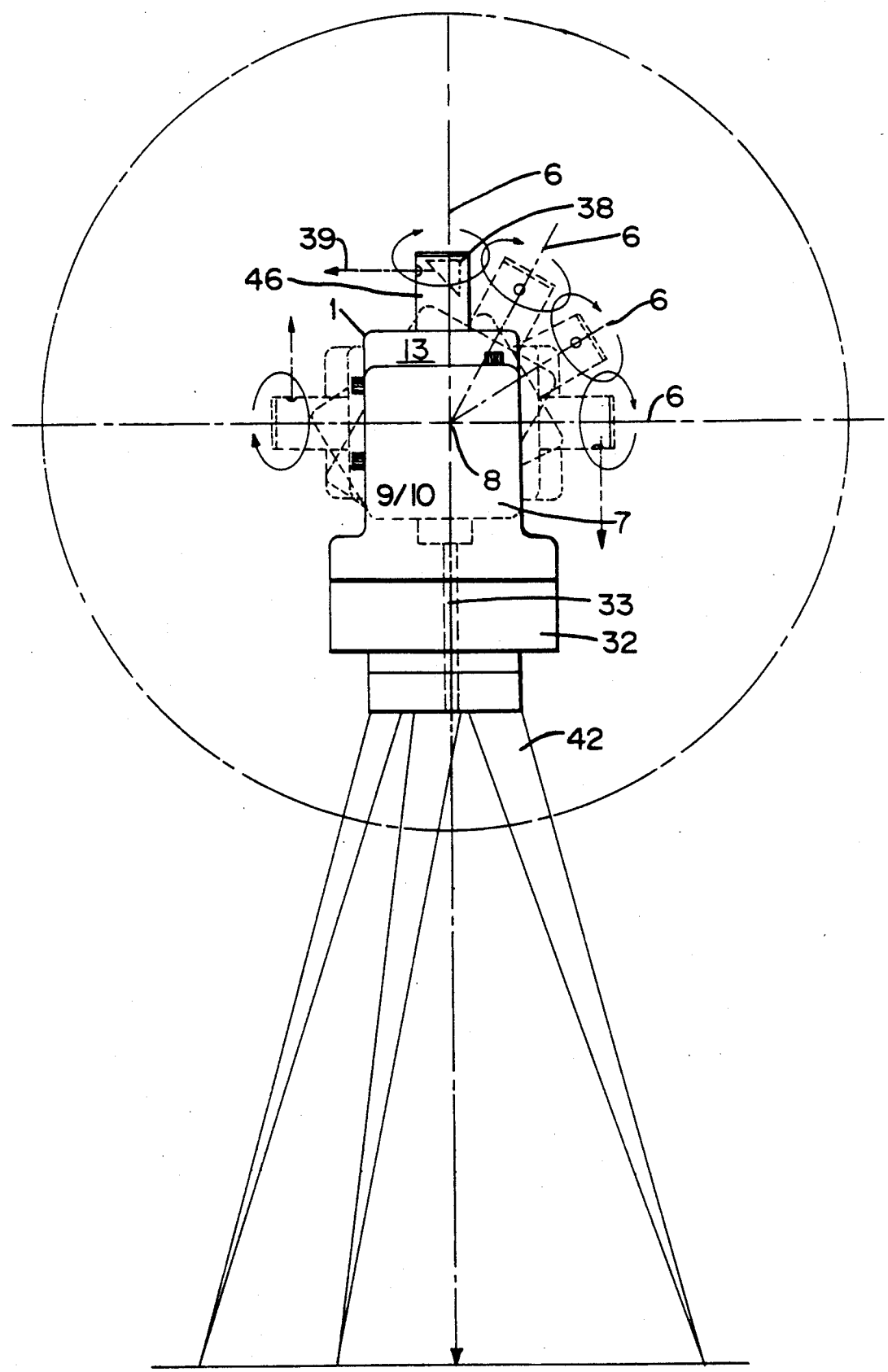

United States Patent [19]

Knittel

[11] Patent Number: 4,988,192

[45] Date of Patent: Jan. 29, 1991

[54] LASER THEODOLITE

[76] Inventor: Ronald A. Knittel, Waechtersbachstr., Gross Umstadt, Fed. Rep. of Germany, 6114

[21] Appl. No.: 432,492

[22] Filed: Nov. 7, 1989

[30] Foreign Application Priority Data

Nov. 13, 1988 [DE] Fed. Rep. of Germany ....... 3838512

[51] Int. Cl.$^5$ .................. G01B 11/26; G01C 1/02
[52] U.S. Cl. .................. 356/138; 33/281; 33/DIG. 21; 356/147
[58] Field of Search .................. 356/4, 5, 138, 141, 356/147, 152, 399, 400; 33/281, 282, 285, 286, DIG. 21

[56] References Cited

U.S. PATENT DOCUMENTS

| | | | |
|---|---|---|---|
| 4,171,907 | 10/1979 | Hill et al. .................. | 356/141 |
| 4,357,107 | 11/1982 | Rösli .................. | 356/147 |
| 4,681,433 | 7/1987 | Aeschlimann .................. | 356/5 |

OTHER PUBLICATIONS

Brochure of Wild Heerbrugg AG "Laserokular Wild Glo2", G1406d-XI.76.
"Dialgrade Laser System", Spectra Physics, 1970.
"Laserfluchtungsgerate fur Ingenieurgeodatische, Anwendungen in Der CSSR", Vermessengtechnik, 1987, vol. 35, No. 11, pp. 377-379.
"Funktionmuster fur ein Ingenieurgeodatisches Lasermehrwerckgerat", Vermessungtechnik, 1982, vol. 30, No. 9, p. 319.
Brochure of Siemens Aktiengesellschaft, "Helium-Neon-Laser LG68", No. B33/1101.
"Beam Machine", AGL Corporation, 1985.

*Primary Examiner*—F. L. Evans
*Attorney, Agent, or Firm*—Ralph W. Selitto, Jr.

[57] ABSTRACT

The device comprises a horizontally and vertically movably supported laser (1), which is mounted in a forked carrier (7) so as to be rotatable through 360° about a tilt axis (8) which extends at right angles to the laser exit beam (6) and which intersects this beam, in the manner of a theodolite.

17 Claims, 4 Drawing Sheets

LASER THEODOLITE

DESCRIPTION

The invention relates to a theodolite, and more particularly to a laser theodolite having two axes of rotation.

Especially for the building industry, laser systems have been developed, which offer a multiplicity of possible applications. Thus, for example, a heliumneon laser is known, with which it is possible to generate a reference line which can be scanned, as to its position, using a sighting chart or by means of receiving sensors. Such a laser beam reference line is used, for example, for the directional correction of building machinery, for the measurement of inclination, for the alignment of walls and ceilings and the like.

However, the possible applications of known lasers are restricted in that their laser tube, which can be rotated horizontally through a complete circle, is greatly restricted with respect to its tilt range. With a tilt range of ±30° about the horizontal position, as is provided with a known laser system (Siemens company publications, order no. B33/1104 and B33/1100), it is not, for example, possible to carry out any zenith plumbing or plumbing to a base which is predetermined or to be determined.

Furthermore, building lasers in the form of rotation lasers are known, in which the exit beam, in addition to a coaxial direction, is deflected through 90° to the central axis of the laser tube. This is achieved by a rotation prism which, when it is rotated with an appropriate speed of rotation, generates an even-surface plane of rotation of the light beam, which plane is represented, for example, on a wall as a reflection surface in the form of a line. Such a rotation laser can be used in a self-leveling manner, and specifically in horizontal operation and also in vertical operation. By means of such a laser it is possible to sight and to mark any selectable point in space, to use it almost as a light pointer, to produce a straight light beam reference line and also to create an even-surface plane of rotation of the light beam. Should it be desired to bring this known laser out of the vertical operation position into the horizontal operation position, the entire laser must be reconstructed by means of appropriate mounting flanges.

The object of the invention consists in the provision of a laser theodolite, the laser of which possesses a large usable tilt range, which permits a direct sighting of any selectable points in space, in particular of a base as well as of a zenith point with simultaneous horizontal beam rotation and which, as a whole, can be handled in a manner which is simple and operationally reliable.

The present invention does not include a telescopic sight as shown, e.g., in the publication Laserokular Wild GL02-GL 406d-XI.76, but does have the capacity to rotate 360 degrees about both a horizontal and vertical axis, and is thus able to generate an even surface light axis, and is thus able to generate an even surface light beam plane of rotation about the horizontal or tilt axis which is interrupted only by the solid portions of the forked carrier. For a zenith plumbing, the laser may be pivoted upwards with its laser beam vertical, and for a base plumbing it is tilted 180 degrees from the zenith position. According to the invention, there is provided in the forked carrier and the bearing upon which it rotates as well as in the support for the theodolite corresponding to the application, e.g. a tripod, a passage opening through which the laser beam can be directed onto a base which is predetermined or is to be determined.

The laser which is used can be a helium-neon laser, an infrared laser, a semiconductor laser or the like. Use can be made, for example, of a semiconductor laser with an appropriate laser diode, as is described in: electronic industrie 9-1988, pp. 23-25.

If the laser theodolite according to the invention is used with a rotation prism, which possesses a beam exit angled at a right angle, rotation planes may be generated in any angular position on account of the universal rotatability of the laser theodolite. A laser theodolite according to the present invention is therefore suitable for the setting-up of orthogonal measurement grids, with which a modern building recording can be made comparatively rapidly with a small risk of error. For example, arches and roof trusses can be measured simply and accurately in all construction planes with the aid of laser beam rotation planes or reflective surface markings.

The universal rotatability of the laser theodolite is of particular benefit in circumstances in which the respective angular position of the laser exit beam can be set or measured accurately. According to a preferred embodiment, a measuring and setting arrangement is accommodated in the two hollow housing parts (extensions) forming the forked carrier bearing the laser. The measuring device within one of the housing parts can be a divided circle (degree wheel), which is secured concentrically with the tilt axis and which can be read by means of a microscope which can be inspected from the outside of the housing. Such divided circles permit the achievement of an accuracy of the angular setting of the tilt axes such as is conventional with modern theodolites, but hitherto not used with lasers. The divided circle can possess a graduation in degrees of angle or in grade, and can be illuminated from inside or outside the housing extension.

A setting disk provided in the other housing part can possess, at the outer periphery in specified angular settings, for example at respective 90° angular spacings, a plurality of engagement elements into which a pull mechanism engages for the registration of the angle of rotation about the tilt axis. Such a mechanism permits a rapid rotation, at a certain angle, of the laser about its tilt axis over the desired scanning pattern, without monitoring the divided circle which is also rotated.

There can be protruded out of the housing, which contains the aforementioned setting disk, an actuating knob for the pull mechanism and also an arresting and fine drive arrangement, which likewise engages the setting disk and permits an arresting of the laser in angular positions between the pull-locked positions, as well as an accurate fine adjustment, observed with reference to the divided circle, of the desired angular position.

The horizontal rotatability of the laser in its forked carrier is implemented by means of a horizontal rotary bearing, which is accommodated in a rotary bearing housing provided below the bearing. This rotary bearing housing can, in addition, contain a horizontal angle measuring and setting arrangement, as well as a self-leveling device. The present invention provides a relatively small, compact unit, which raises the precision attainable with this laser to a higher standard than previously achieved.

Figure 2:
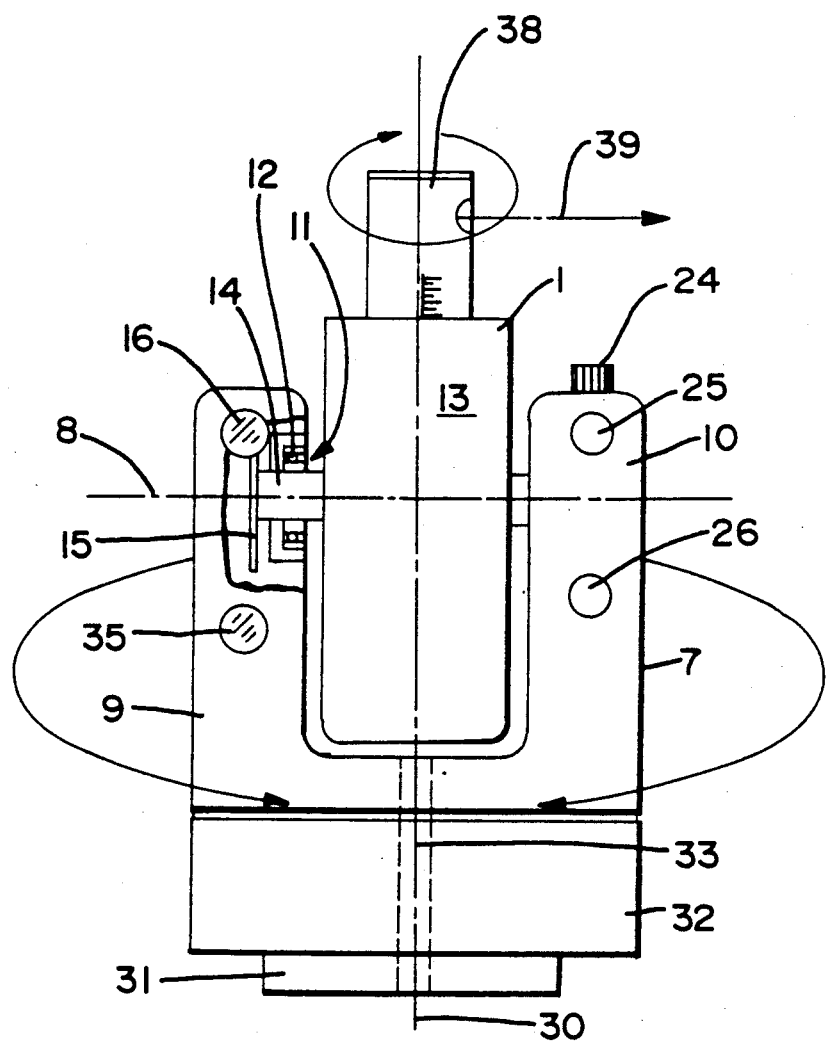
Figure 3:
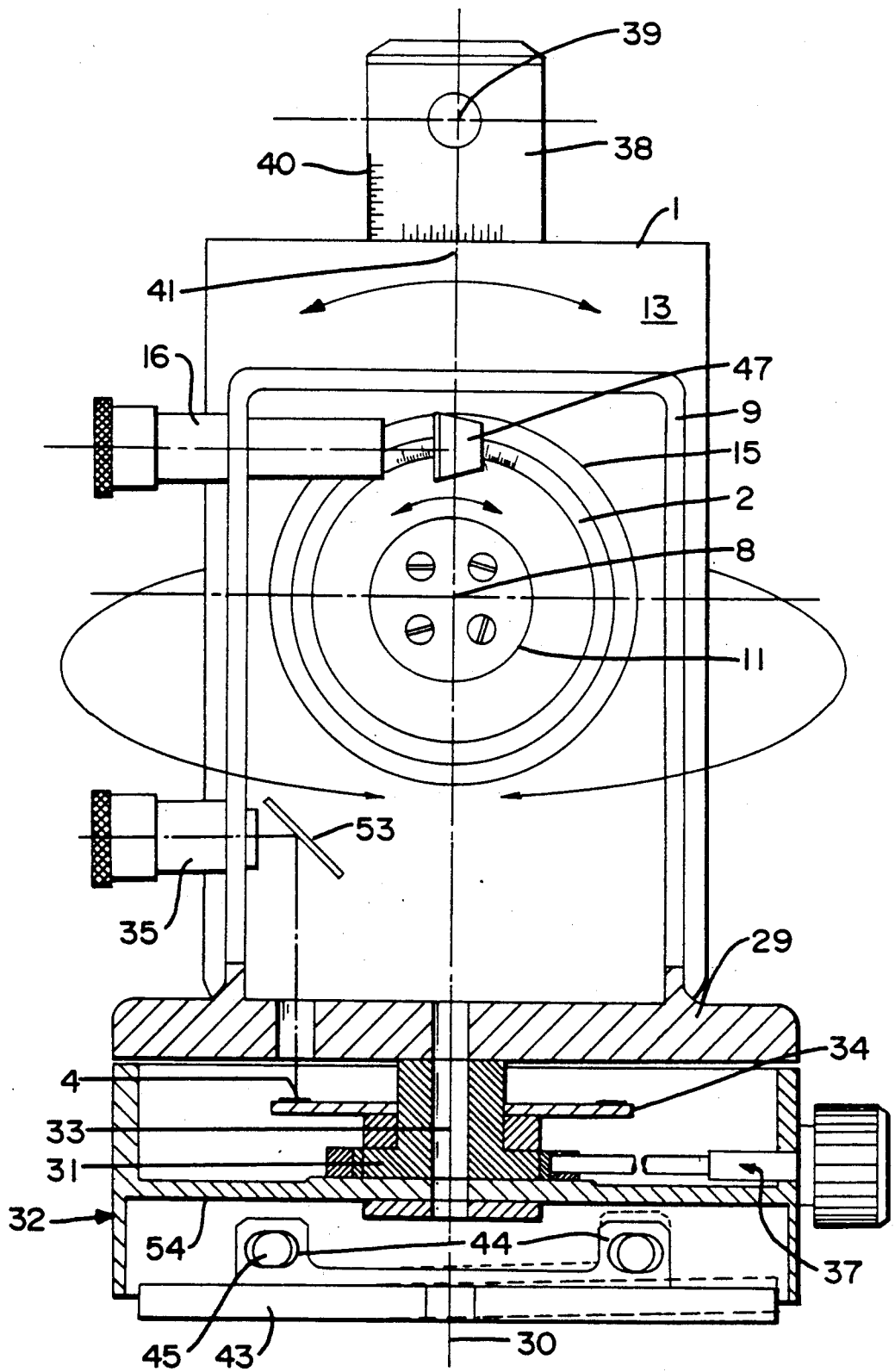
Figure 4:
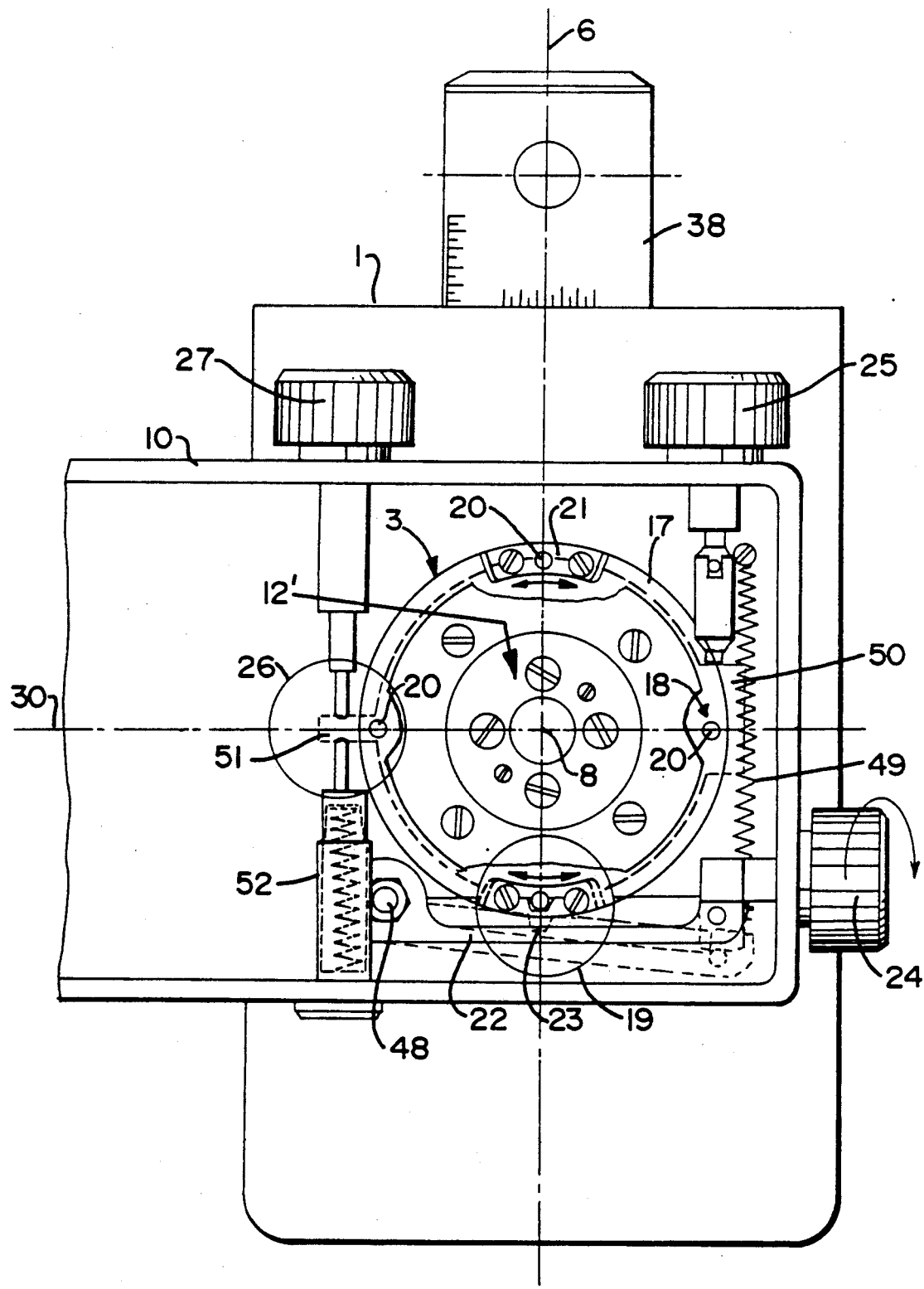

An illustrative embodiment of the invention is explained in greater detail herein below with reference to the drawings. In the drawings:

FIG. 1 shows a diagrammatic side elevation of a device, set up on a tripod, according to the features of the invention, in which the laser is represented in different tilt settings, FIG. 2 shows a front elevation of the device according to FIG. 1, FIG. 3 shows a partially cross-sectional side elevation of the device according to FIG. 1 in order to illustrate different measuring and setting arrangements, as well as a self-leveling device, and FIG. 4 shows a partial side elevation of a portion of the bearing of the device according to FIG. 1 in order to illustrate a tilt axis setting arrangement.

The laser 1 shown in FIG. 1 is mounted in a forked carrier 7 so as to be rotatable through 360° about a tilt axis 8, which extends at right angles to the laser exit beam 6 and which extends perpendicular to the plane of the drawing. The forked carrier 7 comprises two housing extension parts 9, 10, which form the fork arms according to FIG. 2. A respective tilt axis bearing 11, 11' is accommodated in the two housing parts. FIG. 2 shows one of two mutually opposite precision rotary bearings 12 (reference is made to the opposite precision rotary bearing 12' in FIG. 4). Rotary bearing pins 14, 14' projecting from each side part of a housing 13 containing the laser tube project into the tilt axis bearings 11, 11'.

In the housing part 9 which is on the left according to FIG. 2, a measuring arrangement 2 is provided, which exhibits a divided circle or degree wheel 15 secured concentrically with the tilt axis 8 on the rotary bearing pin 14. This divided circle 15 possesses graduation markings, which are indicated in FIG. 3 and which can represent degrees of angle, grade or percentage values. As a result of the rotationally secure connection between the divided circle 15 and the rotary bearing pin 14, any angular movement of the laser 1 about its tilt axis 8 can be seen on the divided circle. The reading of the graduated markings is performed by a microscope 16, which is fitted to the housing part 9 according to FIG. 3 and which makes the graduations of the divided circle 15 visible to an observer by means of a mirror 47. The chain-dotted line passing through the microscope 16 in FIG. 3 indicates the line of sight.

Within the housing part 10 which is on the right according to FIG. 2, a setting arrangement 3 which can be seen in FIG. 4 is secured on the rotary bearing pin 14'. This setting arrangement 3 possesses a setting disk 17, which carries four engagement elements 18 at its peripheral edge at specified angular settings of 90°. A pull mechanism 19 consists of a lever 22, which is mounted on a pivot axis 48 and projects, according to FIG. 4, upwardly out of the housing part 10, as well as an engagement notch 23 on its lever arm, which can engage into a peg 20 of the engagement elements 18. As can be seen, the engagement notch 23 is constructed in a wedge shape, so that, when the lever pivots into its position represented in solid lines and is held by a spring 49, it forms a play-free engagement between the peg 20 and the engagement notch 23. A knob 24 at that end of the lever 22 which is at the top according to FIG. 4 serves for its pivoting into the position which is shown in broken lines in FIG. 4 and in which the pull mechanism 19 releases the setting disk 17 and thereby permits a rotation of the laser 1 about its tilt axis 8.

According to FIG. 4, an arresting arrangement 25 projects into the housing part 10 and serves for the firm clamping of a setting ring 50 sliding on the setting disk 17. If this setting ring is connected, by actuation of the arresting arrangement 25, in a rotationally fast manner to the setting disk 17, a radially projecting setting ring pin 51 can be displaced by means of a fine drive 26, whereby the setting disk 17 and thus the laser 1 executes very fine angular movements. The fine drive 26 further exhibits a spring preloading element 52, which preloads the setting ring pin against the fine drive thrust in a play-free manner. The actuation of the fine drive 26 takes place by means of an actuating knob 27 which is passed out from the housing part 10.

In order to be able to undertake an angular adjustment within the 90° angular distribution of the pegs 20, the two pegs 20 which are opposite according to FIG. 4 are preferably secured to adjustable peg carriers 21.

FIG. 3 shows a horizontal rotary bearing 31 in longitudinal cross-section. An axis of rotation 30 extends in a vertical direction through the tilt axis 8 and forms the center of horizontal rotation for the bearing 7 and the laser 1. A portion 29 connecting the two housing parts 9, 10 of the forked bearing 7 is firmly connected to the horizontal rotary bearing 31. This rotary bearing is accommodated in a rotary bearing housing 32 and carries, concentrically with the axis of rotation 30, a horizontal divided circle or degrees wheel 34, which represents a portion of the measuring arrangement 4. FIG. 3 shows how an observer can inspect the divided circle 34 by means of a microscope 35 and a deflecting mirror 53. The angular graduation of this divided circle can be designed in precisely the same manner as in the case of the above described divided circle 15. The horizontal rotary bearing 31 is equipped with a similar arresting and fine drive arrangement 36, 37 as is shown in FIG. 4. In the representation in FIG. 3 only the fine drive 37 is indicated, while the clamp, which is provided in a manner corresponding to the clamp construction 25 according to FIG. 4, is situated behind the plane of representation and thus cannot be seen in FIG. 3. As is conventional in theodolites, the horizontal divided circle 34 can be provided with a repetition clamping.

The rotary bearing housing 32 is subdivided by a horizontal wall 54, on which the rotary bearing 31 is supported and secured. Below the horizontal wall 54 there is situated a self-leveling device 43, which exhibits a three-point bearing flange 44, which is mounted within the rotary bearing housing 32 so as to be tiltable centrally on all sides with respect to the axis of rotation 30. At that side of the three-point bearing flange 44 which is at the top according to FIG. 3 there engage the drive means of at least two actuating motors 45 which, controlled by electronically adjustable leveling devices (not shown), can displace the bearing flange, for example, into the position shown by broken lines. Since the bearing flange 44 is secured, for example, on a support 42 of a tripod, as is shown in FIG. 1, a change of position by means of the actuating motors 45 brings about a situation in which the forked carrier 7 and thus the laser 1 are tilted in the horizontal plane.

Such an electronically controlled self-leveling can be utilized for an accurate vertical-axis compensation of the vertical axis 55 which can be seen in FIG. 1. As a result of this, the laser exit beam 6 can adopt the respectively desired position, related to the vertical; in this case, a zenith plumbing (cf. FIG. 1) is possible, just like a plumbing to a base 56 which is predetermined or to be determined.

In order that the beam should also be able to pass through the forked bearing or the corresponding portion 29 in the case of the plumbing of the base 56, a passage opening 33 through the horizontal rotary bearing 31 and the self-leveling device 43 is provided. As a result of the automatic leveling, which is provided in a protected manner as a constructional unit within the rotary bearing housing 32, the laser 1 may be set without any problem, even on a fluctuating ground surface and on building sites with vibrations.

In the figures, the laser 1 is represented as a rotation laser, which possesses a rotation prism 38 which has a beam exit 39 angled at a right angle and which, held in a sleeve 46, is mounted so as to be displaceable in the longitudinal direction of the laser exit beam 6. In order to be able to determine and alter the spacing between the right-angled beam exit 39 and the tilt axis 8 in any angular setting of the laser 1, there is provided, as is evident from FIGS. 3 and 4, between the sleeve 46 of the rotation prism 38 and the housing 13 of the laser a raster arrangement 40 for measuring the displacement of the prism sleeve. The raster arrangement 40 can be designed for any selectable accuracy, and can include a spacing dimension (not shown). When the laser 1 is tilted through 90° to the right in FIG. 1, i.e., when it emits a downwardly emerging beam the spacing between the base 56 and the reflection position above the ground may be read off directly by means of the raster arrangement 40.

A further raster arrangement 41 is provided for releasably arresting the rotation prism sleeve 46 at defined rotary positions. This raster arrangement 41 can be seen especially in FIG. 3. This may be used for the purpose of exactly setting the angle of rotation of the right-angled beam exit 39, related to the axis of the laser exit beam 6, so that a precise plumbing is possible without further auxiliary means.

When a rotation laser is used, should it be desired to displace the beam exit 39 at a right angle into the vertical axis 55, there can be provided, between the forked bearing 7 of the laser 1 and the support 42, a bearing eccentric which permits a bearing displacement of a magnitude at least equal to the spacing between the tilt axis 8 and the laser exit beam 6.

Electric current can be supplied to the laser 1 through all degrees of rotation about its tilt axis 8 by means of a rotary electrical contact (not shown) associated with one of the tilt axis bearings 11, 11'. Such a rotary electrical contact not only provides the supply of current to the laser but also provides power for controlling actuating motors, which can be installed in the laser housing 13 for the rotation of the rotation prism 38 or for the prism displacement, in accordance with the raster arrangement 40.

The laser 1 can be provided, externally on the laser housing 13, with a diopter which permits a rapid sighting of the target point. Furthermore, an electronic rangefinder can be provided on the housing 13. Further, a telescopic sight can be provided, to assist in pointing the laser beam on targets no longer easily discernible with the naked eye.

The outer surface, which can been seen in FIG. 1, of the housing part 9 can advantageously carry target markings at 90° angular spacings, in order to mark the tilt axis laterally on the housing parts.

The rotation of the laser 1 about its tilt axis 8 as well as of the forked carrier 7 about the axis of rotation 30, and furthermore the displacement and the arresting of the rotation prism sleeve 46 in specified rotary positions can take place by means of remotely operable actuating motors. Furthermore, the measuring arrangements 2 and 4 can be designed in digital electronics and can be capable of being read by means of a numerical display fitted to the housing parts, in place of or in addition to the microscopes 16 and 35.

I claim:

1. A laser theodolite comprising:
carrier means (7) for rotatably supporting a laser (1), upon tilt bearing means (11, 12, 14), said laser (1) being rotatable about a tilt axis (8) through 360 degrees of rotation, said carrier means rotatably supported upon rotary bearing means (31–32) and rotatable about a vertical axis (30), said rotary bearing means (31–32) having a passage (33) disposed along said vertical axis (30) permitting light from said laser (1) to pass therethrough, means for measuring (2) and means for setting (3) the angular position of said laser about said tilt axis (8), means for measuring (4) and means for setting (5) the angular position of said carrier means (7) about said vertical axis (30), and a rotation prism (38) affixed to said laser (1) at an output aperture thereof for redirecting laser light output from said laser (1) towards a direction perpendicular to said light output.

2. The laser theodolite as claimed in claim 1, wherein said carrier means (7) is forked and includes two opposing extensions (9, 10), each of which accommodates a corresponding tilt bearing (11, 12, 11', 12'), each tilt bearing receiving a corresponding bearing pin (14, 14') projecting from a housing (13) containing said laser (1).

3. The laser theodolite as claimed in claim 2, wherein said two opposing extensions (9, 10) are at least partially hollow and said tilt measuring means (2) is contained within a first extension (9) of said two opposing extensions (9, 10) and said tilt setting means (3) is contained within a second extension (10) of said two opposing extensions (9, 10).

4. The laser theodolite as claimed in claim 3, wherein said tilt measuring means (2) includes a degree wheel (15) coaxially secured to a first bearing pin (14) of said corresponding bearing pins (14, 14'), and further including a microscope (16) affixed to and penetrating said first extension (9) for visualizing said degree wheel (15) contained therein.

5. The laser theodolite as claimed in claim 3, wherein said tilt setting means (3) includes a setting disk (17) coaxially secured to a second bearing pin (14') of said corresponding bearing pins (14, 14'), said setting disk (17) having a plurality of engagement means (18) disposed along a peripheral edge thereof at a corresponding plurality of angular displacements, said engagement means cooperating with mating engagement means (19) to releasably lock said tilt setting means (3) at a selected angular position.

6. The laser theodolite as claimed in claim 5, wherein said engagement means (18) includes pegs (20) projecting substantially perpendicularly from a face of said setting disk (17) proximate to a peripheral edge thereof and secured thereto by peg carrier means (21) the position of said pegs (20) being adjustable about said peripheral edge of said disk (17), and wherein said mating engagement means (19) includes a lever (22) pivotally attached at one end thereof to an interior surface of said second extension (10), said lever (22) having a notch (23) therein for receiving and embracing one of said pegs (20) to hold said setting disk (17) at a selected position, said lever (22) extending through an opening in said second extension (10) to permit pivoting thereof by rotation of a knob (24) located externally of said second extension (10) and connected to said lever (22).

7. The laser theodolite as claimed in claim 1, wherein said rotary bearing means (31, 32) includes a rotary bearing (31) having an axis of rotation substantially at right angles to said tilt axis (8), said rotary bearing being supported within a rotary bearing housing (32) having a hollow, said means for measuring (4) and means for setting (5) the angular position of said carrier means (7) about said vertical axis (30) being contained within said hollow and further including a self leveling device (43) contained within said rotary bearing housing (32).

8. The laser theodolite as claimed in claim 7, further including setting disk arresting means (50) and fine adjustment means (26) which cooperate with each other for the purpose of changing the position of said setting disk (17), said setting disk arresting means (50) and said fine adjustment means (26) having corresponding actuating knobs (25, 27) external to said second extension (10).

9. The laser theodolite as claimed in claim 7, wherein said means for measuring (4) includes a degree wheel (34) affixed to said carrier means (7) coaxially with said vertical axis (30), an additional microscope (35) affixed to and penetrating said rotary bearing housing (32) for visualizing said degree wheel (34), and rotary bearing arresting means (36) and fine adjustment means (37) actuatable from a position external to said rotary bearing housing (32).

10. The laser theodolite as claimed in claim 7, wherein said self-leveling device (43) includes a three point bearing flange (44) disposed below said rotary bearing (31), said flange being tiltable with respect to said vertical axis (30), the degree and direction of tilt being determined by actuating motors (45) controlled by electronically adjustable leveling devices, whereby said tilt axis (8) and said vertical axis (30) can be adjusted.

11. The laser theodolite as claimed in claim 3, wherein said tilt measuring means (2) and said means for measuring (4) the angular position said carrier means (7) each include a digital electronic sensor and a digital display.

12. The laser theodolite as claimed in claim 3, wherein said tilt setting means (3) and said means for setting (5) the angular position of said carrier means (7) each include an electric motor acting upon said laser (1) and said carrier means (7) to adjust their respective positions, said motors being operable remotely through an electronic control system, said motor for said tilt setting means being housed within said second extension (10) and said motor for setting said angular position of said carrier means (7) being housed within said rotary bearing housing (32).

13. The laser theodolite as claimed in claim 1, wherein said rotation prism (38) is held in a sleeve (46) which telescopes into and rotates within a housing (13) containing said laser (1), said laser theodolite further comprising raster means (41) for measuring the degree of rotation of said sleeve (46) relative to said housing (13), additional raster means (40) for measuring the depth of insertion of said sleeve (46) within said housing (13), and sleeve lock means for releasably retaining said sleeve in a selected position.

14. The laser theodolite as claimed in claim 13, wherein said sleeve (46) is positioned and releasably retained in a selected position by at least one remotely operated actuating motor.

15. The laser theodolite as claimed in claim 13, further including bearing eccentric means for permitting a displacement of said rotary bearing means (31, 32) a distance at least equal to the spacing between said tilt axis (8) and a laser light beam emitted by said laser (1), said bearing eccentric means being disposed between said carrier means (7) and a support (42) for said laser theodolite.

16. A laser theodolite as claimed in claim 1, wherein said tilt bearing means includes a rotary electrical contact for supplying electric current to said laser (1).

17. A laser theodolite as claimed in claim 16, wherein the position of said rotation prism is determined by actuating motors and wherein said rotary electrical contact supplies electrical power to said actuating motors.

* * * * *